2 Sheets--Sheet 1.

A. H. TAIT & J. W. AVIS.

Improvement in Apparatus and Processes of Distilling Petroleum and other Oils.

No. 4,366. Reissued May 2, 1871.

Witnesses:
W. Haupt
O. H. Stanworth.

A. H. Tait
Joseph W. Avis
Inventor

2 Sheets--Sheet 2.

A. H. TAIT & J. W. AVIS.

Improvement in Apparatus and Processes of Distilling Petroleum and other Oils.

No. 4,366. Reissued May 2, 1871.

Witnesses:
W. Hauff
N. K. Ellsworth.

A. H. Tait
Joseph W. Avis
Inventors.

United States Patent Office.

AUGUSTUS H. TAIT AND JOSEPH W. AVIS, OF NEW YORK, N. Y., ASSIGNORS, BY MESNE ASSIGNMENTS, TO CHARLES PRATT, OF SAME PLACE.

Letters Patent No. 53,359, dated March 20, 1866; reissue No. 4,366, dated May 2, 1871.

IMPROVEMENT IN APPARATUS AND PROCESSES OF DISTILLING PETROLEUM AND OTHER OILS.

The Schedule referred to in these Letters Patent and making part of the same.

*To all whom it may concern:*

Be it known that we, AUGUSTUS H. TAIT and JOSEPH W. AVIS, of the city, county, and State of New York, have invented a new and useful Improvement in Apparatus and Process for Distilling Petroleum and other Oils; and we hereby declare the following to be a full, clear, and exact description thereof, which will enable those skilled in the art to make and use the same, reference being had to the accompanying drawing forming part of this specification, in which—

Similar letters of reference indicate like parts.

Figure 1:
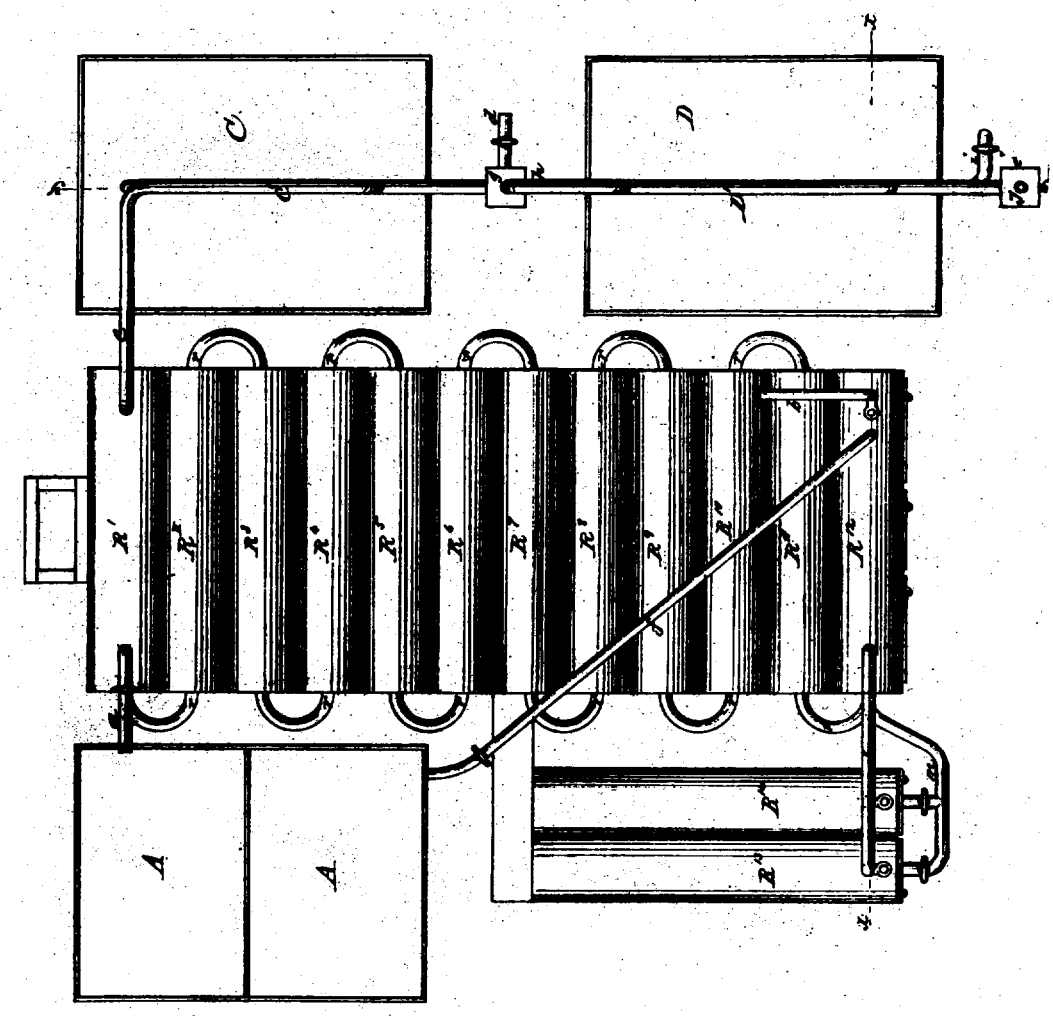
Figure 1 represents a plan or top view of the invention.
Figure 2:
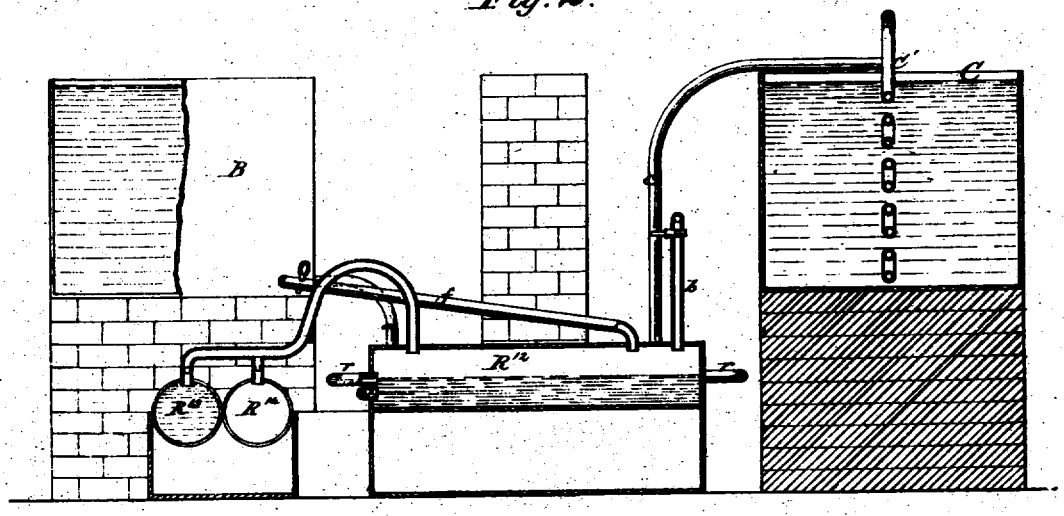
Figure 2 is a transverse vertical section of the same, the line *x x*, fig. 1, indicating the plane of section.
Figure 3:
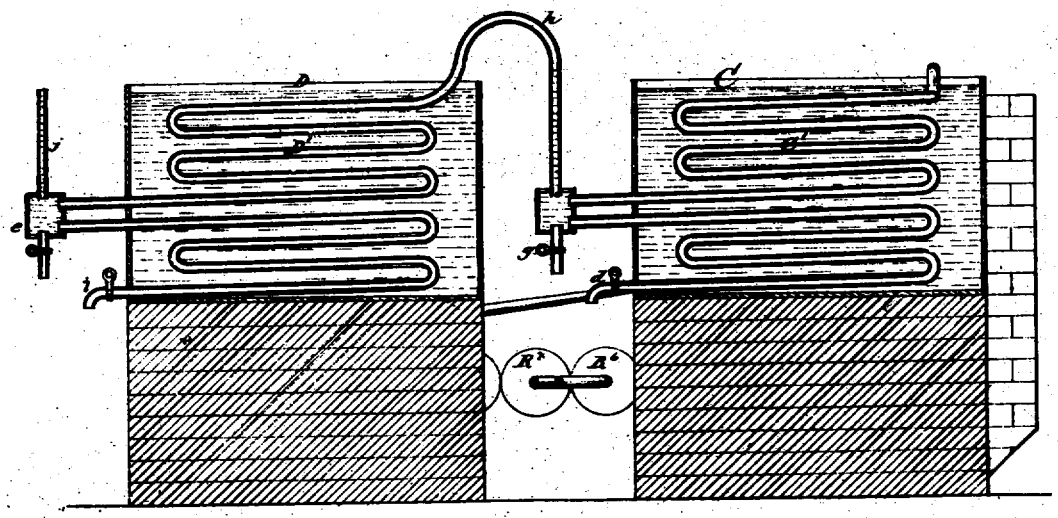
Figure 3 is a longitudinal vertical section of the same, the plane of section being indicated by the line *y y*, fig. 1.

This invention refers to a distilling apparatus which is particularly intended for the purpose of refining petroleum and for separating the various ingredients thereof according to their specific gravity or their different boiling points.

According to the present method, in distilling petroleum and other hydrocarbon oils and also other fluids in large stills containing a large body of oil or fluid, it has to be subjected to a very intense and continuous heat, producing destructive distillation, resulting in loss of quantity on the one hand and on the other hand subjecting the body of the fluid to the liability of becoming charred or burned by the heavy or tarry matter settling to the bottom, thus discoloring the distillate and giving it an unpleasant odor, which requires a large amount of chemicals to remove.

Again, if this tarry matter is allowed to remain in the still until the operation is finished it becomes coked, forming a solid deposit at the bottom of the still, making it necessary to stop the works, cool the still off, and remove the deposit.

Again, in order to drive off or distill the heavier oils from this tarry deposit the application of a very intense heat is required, which tends to destroy the bottom of the still.

To obviate these difficulties our invention consists in running the oils into a series of stills arranged over an arch or furnace, the oil entering at that retort or part of the still furthest from the fire; and as the more volatile portions are distilled and a higher temperature is necessary to vaporize the remainder of the oil, it passes by suitable communication to a hotter still, and finally, before coking, it is removed to what we term tar-stills, which are smaller and much less expensive; but being subject to such intense heat they require constant repairs. While one is being repaired the fluid is turned into another.

This is a great advantage, and by means of this arrangement we are enabled to remove all the tarry or heavy matter in a hot state while the stills are running, and of finishing the entire process without interruption.

The trouble which has heretofore prevented continuous distillation has been the difficulty of removing the tarry or heavy matter while the process was in operation.

The following description will enable one skilled in the art to make and use our invention.

In the drawing—

A represents a tank, which contains the crude oil, and which communicates by a pipe, *a*, with the first one of a series of retorts, $R^1$ $R^2$ $R^3$ to $R^{12}$. These retorts are made of cast-iron or any other suitable material, in a cylindrical or any other desirable form or shape, and are placed horizontally alongside of each other over a flue, which is provided with a fire-grate situated under the retort $R^{12}$, and which extends from said grate to the chimney that rises in close proximity to retort $R^1$.

The several retorts connect with each other by means of pipes *r*, which extend from the opposite ends of the same, so as to cause the liquid or fluid introduced into the retort at one end of the series to pass through the several retorts in a zigzag course.

The crude oil flows in a continuous stream into the retort $R^1$, and thence through the first pipe *r* to the second retort, and so on until all the retorts are filled up about half, or to the middle of the connecting-pipes *r*. At this stage heat is applied by lighting a fire on the grate under the retort $R^{12}$.

The oil in the retorts is thus gradually heated, that in the retort $R^{12}$ being hottest, and that in retort $R^1$ remaining coolest; and, consequently, the lightest components of the oil will be evaporated in the first and the heaviest components in the last retort.

The vapors thus formed pass off through the connecting-pipes *r* from the retorts through pipe *c* to the first condenser C, and in order to drive off the vapors by mechanical force a stream of steam or heated compressed gas is passed into the last retort $R^{12}$, through the pipe *b*, which connects with a suitable generator provided with a stop-cock, so that the supply of steam or heated gas can be regulated at pleasure.

While passing through the retorts the heavy vapors of the last retorts, $R^{12}$, $R^{11}$, &c., mix intimately with the light vapors of the first retorts, $R^1$, $R^2$, &c., and the product of condensation derived from the mixture of vapors is of the requisite density for burning-oil.

The condenser C consists of a plain tank of sheet metal or any other suitable material, in which is situated a serpentine pipe, C′. The several bends of this pipe are placed one above the other, so that the same are situated in different levels, and consequently the products of condensation derived from the several bends will be of different specific gravity, since the water in the condenser is coolest at the bottom and hottest on top. By tapping said serpentine pipe at different levels, therefore, liquids of different specific gravity will be obtained.

We do not wish to confine ourselves, however, to the precise form of a serpentine pipe shown in the drawing, since an ordinary coil placed in a vertical or a horizontal position will produce the same or a similar result; but we use said serpentine pipe by preference, as the products of distillation drawn from it at different levels can be readily distinguished according to their specific gravity.

The heavier oil, which has a higher boiling point, is condensed in the upper bends, where the water is hottest, and can be drawn off through the tap and cock *g*, while the light oils are drawn off at the tail-pipe *d*. The specific gravity of the oil drawn from said tail-pipe can be regulated by drawing more or less of the heavy oil through the trap and cock *g*; and, if desired, by an additional supply of cold water to the condenser the quantity of light oils condensing in the serpentine pipe can be increased.

If a heavy oil is required at the tail-pipe *d* the cock *g* must be checked or closed and the heavy oil allowed to pass onto the tail-pipe *d*, and the supply of cold water must be checked, so as to allow a greater portion of the light oil of the distillate to pass over into the second condenser D, which connects with the first condenser C by the pipe *h*.

These light oils and heavy naphtha are again separated during their passage through the second condenser, which is furnished with a serpentine pipe, D′, trap and cock *e*, and tail-pipe *i*.

By regulating the supply of cold water the light oil and naphtha of a density under 68° are drawn off at the trap and cock *e* and collected in a separate receiver, whence it is pumped up into the tank B for future use, while the gasoline or light naphtha is received at the tail-pipe *i* and collected in a separate receiver, and the uncondensable gases pass off by the gas-pipe *j*.

The lower part of the first condenser C below the trap *g* may be considered as a refrigerator to thoroughly cool the distillate.

The light oils and naphtha collected in the tank B, as previously stated, may be run back to the retort $R^{12}$ through the pipe *f*, and the vapors rising therefrom, by being mixed with the heavy vapors contained in the last retorts, produce a distillate of the desired specific gravity.

The heavy products, such as tar and pitch, remaining in the retort $R^{12}$, are passed into one of the retorts $R^{13}$ or $R^{14}$, which are placed separate from but contiguous to the first series, set lengthwise over a separate fire-place, and divided by a partition-wall, so that they can be used alternately. They are set a little lower than the first series, so as to allow a fall for the tar and pitch to pass through the connecting-pipe *m*, which is provided with suitable branch pipes and cocks, so that either of the retorts $R^{13}$ or $R^{14}$ can be brought in communication with the retort $R^{12}$.

The object of having two or more additional retorts is to enable the operator to clean out the coke from one retort while the other is working without stopping the process.

By means of this apparatus all the available constituents of crude petroleum are saved, and the percentage of burning-oil obtained is considerably larger than that obtained by ordinary distilling apparatus. Furthermore, by our apparatus the distilling process can be carried on without interruption, and its operation requires a comparatively small expenditure of fuel.

It is obvious that this apparatus may be used for distilling other liquids besides petroleum, such as coal-oil and other mixtures having different boiling points.

What we claim as new, and desire to secure by Letters Patent, is—

1. The process of continuous distillation, the same consisting in causing the oil to flow through a series of retorts arranged over an arch or flue, so that the oil enters at the colder portion of the series and leaves at the hottest portion, as set forth.

2. One or more tar-stills so connected with an oil-still or stills that the heavy residue may be removed without interrupting the distillation, as set forth.

3. A series of stills, arranged horizontally over an arch or flue, and connected together, so that oil entering the still furthest removed from the fire is gradually heated as it flows from one still to another and the vapors driven off, as set forth.

4. A series of stills in which the oil is vaporized as it flows through them, in combination with one or more tar-stills, as set forth.

This specification signed by us this 11th day of April, 1871.

A. H. TAIT.
JOSEPH W. AVIS.

Witnesses:
W. HAUFF,
JNO. D. PATTEN.